United States Patent
Compera et al.

(10) Patent No.: US 10,710,268 B2
(45) Date of Patent: Jul. 14, 2020

(54) METHOD, DEVICE AND SYNTHESIS ELEMENT FOR CONNECTING AN EDGE MATERIAL TO A WORKPIECE

(71) Applicant: HOMAG GmbH, Schopfloch (DE)

(72) Inventors: Christian Compera, Schonau (DE); Markus Flik, Stuttgart (DE); Axel Petrak, Horb (DE); Johannes Schmid, Starzach (DE)

(73) Assignee: HOMAG GMBH, Schopfloch (DE)

(*) Notice: Subject to any disclaimer, the term of this patent is extended or adjusted under 35 U.S.C. 154(b) by 100 days.

(21) Appl. No.: 15/326,787

(22) PCT Filed: Jul. 14, 2015

(86) PCT No.: PCT/EP2015/066054
§ 371 (c)(1),
(2) Date: Feb. 16, 2017

(87) PCT Pub. No.: WO2016/008878
PCT Pub. Date: Jan. 21, 2016

(65) Prior Publication Data
US 2017/0203464 A1    Jul. 20, 2017

(30) Foreign Application Priority Data
Jul. 18, 2014   (DE) .................. 10 2014 214 035

(51) Int. Cl.
*B27D 5/00* (2006.01)
*B29C 65/48* (2006.01)
(Continued)

(52) U.S. Cl.
CPC .............. *B27D 5/003* (2013.01); *B29C 65/48* (2013.01); *B29C 66/344* (2013.01); *B29C 66/02* (2013.01);
(Continued)

(58) Field of Classification Search
CPC ....... B27D 5/003; B29C 65/48; B29C 66/344; B29C 66/02; B29C 66/026; B29L 2007/00
(Continued)

(56) References Cited

U.S. PATENT DOCUMENTS 3,418,196 A * 12/1968 Luc ...................... B29C 66/7487
156/73.1
5,954,915 A * 9/1999 Voorhees ............... B27D 5/003
144/129
(Continued)

FOREIGN PATENT DOCUMENTS

DE         4422449 A1 * 1/1996 ............... B27D 1/00
DE    102012223987 A1    6/2014
(Continued)

OTHER PUBLICATIONS

International Preliminary Report on Patentability dated Jan. 24, 2017 with respect to international application No. PCT/EP2015/066054.
(Continued)

*Primary Examiner* — Sonya M Sengupta
(74) *Attorney, Agent, or Firm* — Scott R. Cox

(57) ABSTRACT

Disclosed is a method for connecting a connecting face of an edge material to a connecting face of a workpiece by a synthesis element, including the steps: of making available the workpiece, feeding the synthesis element, which is made available by at least one function film composed of an adhesive, activating the adhesive function film, applying the synthesis element to one of the connecting faces, connecting the synthesis element to the other of the connecting faces, wherein the workpiece and the edge material are connected by the synthesis element located between them. Furthermore, there is disclosed a synthesis element and a device for connecting a connecting face of an edge material to a connecting face of a workpiece.

20 Claims, 2 Drawing Sheets

(51) Int. Cl.
B29C 65/00 (2006.01)
B29L 7/00 (2006.01)

(52) U.S. Cl.
CPC ......... *B29C 66/026* (2013.01); *B29L 2007/00* (2013.01)

(58) Field of Classification Search
USPC ...................................................... 156/304.5
See application file for complete search history.

(56) References Cited

U.S. PATENT DOCUMENTS

| | | | |
|---|---|---|---|
| 9,694,457 B2 * | 7/2017 | Rathgeber | ................ B23Q 7/03 |
| 2002/0189754 A1 * | 12/2002 | Hill | .......................... B27D 1/00 |
| | | | 156/297 |
| 2011/0076446 A1 * | 3/2011 | Borgwardt | ........ B29C 66/30326 |
| | | | 428/137 |
| 2012/0305168 A1 * | 12/2012 | Schmid | ................ B29C 63/003 |
| | | | 156/73.1 |

FOREIGN PATENT DOCUMENTS

| | | | | |
|---|---|---|---|---|
| EP | 1163864 | B1 | 9/2004 | |
| EP | 2335891 | A1 * | 6/2011 | ............. B27D 5/003 |
| EP | 2942740 | A3 | 3/2016 | |
| WO | WO-9948683 | A1 * | 9/1999 | ............. B32B 21/08 |
| WO | WO0136168 | A1 | 5/2001 | |
| WO | WO-2014095844 | A1 * | 6/2014 | ............. B27D 5/003 |

OTHER PUBLICATIONS

International Search Report dated Oct. 5, 2015 with respect to international application No. PCT/EP2015/066054.

* cited by examiner ly, it must have appropriate properties depending on the function of the finished workpiece. One requirement, for example, is to use the adhesive to manufacture an invisible joint, i.e. to ensure that at best this joint can no longer be seen by the human eye on the subsequent product. This is achieved, for example, in that the adhesive layer is executed very thinly.

METHOD, DEVICE AND SYNTHESIS ELEMENT FOR CONNECTING AN EDGE MATERIAL TO A WORKPIECE

SUBJECT MATTER OF THE INVENTION

The present invention relates to a method for bonding a connecting face of an edge material to the connecting face of a workpiece by means of a synthesis element. In addition, the present invention relates to an apparatus for carrying out this method and to the synthesis element which is used in the method or is processed in the apparatus.

PRIOR ART

It has proven successful to coat the cut surfaces of panel-shaped workpieces, referred to as workpiece narrow surfaces, with a strip-shaped coating material. Thus, on the one hand, the narrow surface can be adapted to the properties of the workpiece surface of the workpiece without requiring costly refinishing. On the other hand, such a coating makes it possible to execute the core of the workpiece in a different, for example less expensive, material than the outwardly visible surfaces.

An adhesive or glue is used to bond the workpiece to the edge material. Here, in particular an adhesive is used which is activated by an input of energy and only then can create a strong bond between two components.

There are numerous options for integrating this adhesive into the joining process. Thus EP 1 163 864 B1 proposes a method in which a plastic edge is coextruded with an adhesive layer. This bond between edge material and activatable adhesive layer is then melted in the region of the adhesive using laser light during application to the workpiece and is pressed onto the workpiece. Such a method, however, requires precise coordination during the entire production process and, due to the specially prefabricated edge band, results in a lower level of vertical integration of the production plant. In other words, such a system has the drawback that the prefabricated adhesive bond is optimized for a particular product which means that a specially manufactured edging compound is necessary if, for example, other properties are required for the adhesive. Added to this are increased requirements during storage, not only due to the range of versions that have to be stocked but also with respect to the storage of an edge band compound. For example, during storage it must be ensured that the adhesive layer and the edge material form a bond within the generally rolled up edge band. Consequently, a production plant designed in this manner has particular drawbacks if a wide variety of products is required.

However, in the furniture industry, for example, the demand is for an ever increasing variety of products from which corresponding requirements can be inferred for the machine tools. Similarly to the fashion industry, furniture manufacturers are also changing their collections at ever shorter intervals and at the same time are offering, for example, new color combinations or cross-functional furniture lines that have a coordinated design for different functional areas, such as lounge, kitchen and bathroom. Added to this is the fact that furniture is not only manufactured for private use but also for industry, such as office and laboratory furniture which may be subject to higher quality requirements. For the manufacturing industry, it is therefore advantageous to have production plants available with a higher level of vertical integration which enables them to adapt to the widest variety of products without too much effort and expenditure.

In this case, the adhesive plays a key role. That is to say, it must have appropriate properties depending on the function of the finished workpiece. One requirement, for example, is to use the adhesive to manufacture an invisible joint, i.e. to ensure that at best this joint can no longer be seen by the human eye on the subsequent product. This is achieved, for example, in that the adhesive layer is executed very thinly.

One way of achieving such thin layers of adhesive is to apply the adhesive layer directly, e.g. by spraying, on at least one of the connecting partners. In addition to the maintenance effort which such spray devices require, with a particularly absorbent connecting partner, such as chipboard, the problem which additionally emerges is that a majority of the adhesive is soaked up by the pores of the workpiece and therefore cannot develop its effect with regard to the bond with the edge material or can only develop it to a limited extent. Added to this is the fact that adhesives suitable for invisible joints are more expensive which means that a higher volume of adhesive, to counteract the suction effect, is inevitably associated with higher costs.

To avoid the drawback of the spray device referred to above, patent DE 199 55 575 B4 discloses an adhesive element that has a one-piece basic body or matrix and is provided on both sides with an activatable adhesive. In other words, the adhesive element of DE 199 55 575 B4 is composed of a carrier material and an adhesive layer. So that the carrier material does not impede the invisible joint because of its additional thickness, the carrier material is pressed as far as possible into the workpiece during edging of the workpiece narrow surface. The extent to which this succeeds depends greatly on the elastic properties of the workpiece material such that an invisible joint can only be achieved with a specific combination of workpiece and adhesive element. In addition, the previous problem also arises here in that a higher volume of adhesive may be necessary to counteract the absorbency of a connecting partner.

Another strategy for creating an invisible joint is to color conceal the joint region, i.e. the portion between the edge band and the narrow surface of the workpiece. This, however, requires an exact color match.

In addition to creating a strong bond between edge material or edge band and workpiece narrow surface, it may also be necessary, depending on the area of use, for the adhesive to have sealing properties so as to seal the core material of the connecting partners.

PRESENTATION OF THE INVENTION

As a result of the explanations above, the object of the present invention was to increase the vertical integration of the coating or edging apparatus so as to thus be able to manufacture a more diverse product range. In other words, the object of the present invention was to provide an apparatus which has a high level of flexibility with regard to the adhesive for bonding a workpiece surface to a coating material. A further object of the invention was to overcome the drawbacks of the prior art described above with regard to the joint region, in particular to make the joint region highly adaptable to the relevant requirements of the product to be manufactured.

As a solution, the present invention provided the method of claim 1, the synthesis element of claim 10 and the apparatus of claim 14.

Thus the present invention provides a method for bonding a connecting face of an edge material to the connecting face of a workpiece by means of a synthesis element. In this case, the method comprises the following steps. First, a workpiece is provided. Furthermore, in one step a synthesis element, which is provided by at least one function film, is fed in, wherein at least one function film is composed of an adhesive. In a further step of the method, an adhesive function film is activated. In addition, the synthesis element is applied to one of the connecting faces.

The synthesis element is also joined to the other of the connecting faces such that the workpiece and the edge material are bonded together by means of the synthesis element located between them.

In this embodiment, a function film which is composed of an adhesive is used. In other words, according to the invention, the carrier layer described above is omitted in order to feed the adhesive to the joint region. Thus the adhesive function film itself takes over the function of the carrier material here. It is therefore self-supporting. A visually very high quality invisible joint is produced due to the fact that an additional carrier layer is omitted. Consequently, the method according to the invention is particularly suitable for connecting faces of workpieces and edge materials in which any additional material in the joint region would result in a thicker joint.

Activation of the adhesive preferably takes place before application to a connecting face. However, the synthesis element can also be stuck first to only the connecting face of the edge material and/or the connecting face of the workpiece. Thus, activation of the adhesive function film in the synthesis element cannot take place until after the synthesis element has been pre-fixed to a connecting face. Sticking in this context is understood to mean that the adhesive function film adheres to the extent that it brings about only a potentially irreversible attachment, while the ultimate strength of the bond is only effected by subsequent activation of the adhesive function film. This pre-fixing is achieved either by simply pressing the adhesive function film onto the connecting face or by means of limited or partial activation of the adhesive function film.

In a further embodiment of the method, the synthesis element is additionally provided with a carrier function film which is preferably activatable.

In this embodiment, the adhesive function film is supported by the carrier function film such that feeding of the synthesis element to the first connecting face, to which the synthesis film is bonded, can be carried out more easily. This method is particularly interesting for workpieces or edge material into which carrier material can be pressed.

In this embodiment, the carrier function film is provided with the adhesive function film preferably on only one side. If the carrier function film is activatable, the result is therefore a 2 component adhesive bond in which the adhesive of the one film can advantageously supplement the adhesive of the other film.

In a particularly advantageous embodiment of the method according to the invention, the carrier function film is activatable and is preferably to be activated differently to the adhesive function film.

With an activatable carrier function film, in the activated state the carrier material can be used advantageously as a primer instead of being pressed in. In particular, this primer can counteract the absorbency of a workpiece or the edge material by, for example, sealing the pores present on a connecting face. Thus, for example, for an especially absorbent material, like a chipboard panel, such an adhesive compound can be advantageous since, on the one hand, a thin layer of adhesive facilitates a durable invisible joint, while a second adhesive, i.e. the activated carrier material, penetrates into the absorbent workpiece material and thus acts as a kind of primer by sealing the pores present there.

As a result, a visually advantageous invisible joint is achievable, on the other hand it is possible to provide the product with the required properties, such as watertightness or fire resistance, beyond the joint region.

The carrier material is preferably activated only after using the adhesive function film, if the adhesive function film is designed to be thinner than the carrier material. Thus, for example, the adhesive function film can first be bonded to one of the connecting faces, followed by activation of the carrier function film for a bond with the other connecting face or a further function film.

The different activation advantageous for this can be achieved by different levels of energy input, such as by different wave lengths, particle speeds, field strength or temperatures. Furthermore, it is possible to use different activation sources for the function films which exploit different effects for activating the function films. For example, the adhesive function film could be selectively activated by a laser while the carrier function film is prepared for a bond using hot air. If the same activation principle is used for function films, it is nevertheless possible to achieve a different activation in that the material of the adhesive function film and the material of the carrier function film, for example, react to the energy input at different speeds or intensities, in that an additional function film causes a different activation or in that the thickness of one film is chosen to be different to the thickness of the other film.

In a further especially preferred embodiment of the method, at least one further function film is integrated into the synthesis element, wherein the function film is preferably provided on one side with an adhesive function film.

Integrating at least one further function into the synthesis element means on the one hand that a joint region can be produced which meets even the most specific requirements; on the other hand, however, a large range of variations is achieved in the properties of the synthesis element by choosing the function films appropriately. If the adhesive function film is applied on one side of the additional function film, a plurality of function films with different functions can be integrated into the synthesis element in this manner. Alternatively, it is possible to design the function film to be self-activatable or to supply it from the outset with an adjacent activatable function film.

In a further preferred embodiment, the function film supports the activation of at least one other function film or prevents the activation thereof.

This preferred embodiment of the method makes it possible for a particularly efficient input of energy to take place in at least one of the function films, e.g. as a result of energy which is reflected or absorbed on the activation function film supporting the activation of a different function film. On the other hand or at the same time, such a function film can prevent the activation of a different function film by having insulating properties, for example.

In a further preferred embodiment of the method, a function film is used to color match at least a part or a portion of the joint region.

The color matching can support the creation of an invisible joint as the joint region becomes virtually invisible to the observer. It is equally possible to design the joint region in a contrasting color so as to create a visually appealing effect.

As the joint region is located between the edge material and the workpiece, its properties are essentially determined by the properties of the synthesis element. In the present invention, these properties of the synthesis element are significantly influenced by the complementary properties of the function films. With regard to the color matching of this embodiment, it is possible in this case to use function films specifically intended for this purpose. It is also possible to use function films which also fulfil another function simultaneously for the color scheme.

The color scheme of such a function film can result, for example, from the color of the function film itself, coloring of the function film or a physical or chemical change in the function film. A chemical or physical change in the function film can be brought about, for example, by exposure to light or by irradiation. In addition, it is particularly preferable, when using a multifunctional layer, to color the adhesive function film, to extrude it with the appropriate color or also to manufacture it by means of an adhesive application using a correspondingly colored adhesive on one of the function films of the synthesis element.

It is particularly preferable to carry out the color matching of this embodiment during the production process so that possible deviations from the intended color can be corrected on the spot.

In a further preferred embodiment of the method, the saturation of the colored function film is preferably adjusted while applying it by stretching.

Using this embodiment, it is possible, in an easy and accurate way, by mechanically stretching the function film to adjust the saturation of its color in line with visual requirements. More precisely, stretching the function film reduces its thickness so that less color pigments per volume are present. The saturation of this color decreases in the joint region due to the reduced number of color pigments. It is particularly preferable during the color matching of this embodiment that the at least one function film used for this is fused or mixed at least in sections with other function films during the activation so as to achieve a uniform color of the joint region.

In a further preferred embodiment of the method, the color matching is carried out with a plurality of differently colored function films.

In this embodiment, the color of the joint region can be adjusted in a simple manner. An even more accurate adjustment can be achieved with the embodiment referred to above by using the stretching technique on at least one function film. It is also possible to adjust the color over a larger area by combining the differently colored function films.

Using a plurality of differently colored function films facilitates the creation of a target color by overlaying. Color models, such as RGB or CMYK for example, can be used for this. A different number of color component films will be required depending on the color model. That is to say, three or four in the examples referred to.

In a further preferred embodiment of the present invention, at least one dimension of the synthesis element or of at least one function film is adapted to at least one of the connecting faces by means of stretching.

Using this embodiment, workpieces with connecting faces or narrow faces of different widths can be bonded to the edge material with the same synthesis element or function film. In this case, the stretching preferably takes place via appropriately arranged and controlled rolls which, to support the stretching function, can rotate at different speeds and/or can be made variable in their spacing so that they form a roll gap. This embodiment can also be used particularly advantageously after the activation or partial activation of a function film since, as a result of this, stretching can be made easier due to the input of energy which has taken place beforehand.

Furthermore, the present invention provides a synthesis element for bonding a workpiece to an edge material having at least one function film, wherein the at least one function film is composed of an adhesive.

A synthesis element that is only composed of one adhesive function film has the advantages already described in connection with the method above. The use of a series of function films provided for by the invention, each of which contributes specific properties to the synthesis element, results in a high level of adaptability with regard to the requirements placed on the joint region.

In a preferred embodiment of the invention, the synthesis element has at least one further function film, which is selected from the group which comprises a carrier function film, an information function film, an insulation function film, an absorption function film, a reflection function film and a color function film.

A carrier function film supports the adhesive function film such that in particular feeding the adhesive function film to the synthesis element and/or to a connecting face can be carried out more easily since damage to the adhesive function film is prevented. An information function film can provide the product with information, such as manufacturing or production information for example. Moreover, it is possible by means of such an information function film to make a kind of sensor available to the product which provides information about the state of the joint region, such as whether the watertightness of the joint region has deteriorated. Reference is made to the patent application with the file reference DE 10 2014 208 746.5 for further examples regarding the function film. Using the insulation function film, the absorption function film and/or the reflection function film, it is possible to achieve the positive effects referred to above with respect to the activation of function films of the synthesis element. The same applies to the effects that can be achieved with a color function film which has also been explained already in connection with the method according to the invention.

In a preferred embodiment of the synthesis element, the adhesive function film comprises PU, PUR, PVAc, EVA, polyolefin and/or APAO.

These adhesives have proven to be particularly useful in connection with manufacturing an invisible joint as they support a thin but strong adhesive layer. In this case, these adhesives are particularly suitable for bonding workpiece faces and coatings which have low absorbency. Together with other function films, the use of these adhesives can also be improved for more absorbent materials.

In a particularly preferred embodiment of the present invention, the adhesive is formed from a 2 component adhesive system which preferably comprises at least one hardener function film and one binder function film.

This embodiment has the advantage that the two components cannot act as adhesives per se and therefore the adhesive effect can only be brought about very specifically by bringing them together. Thus it is possible to prevent an undesirable premature adhesive effect, e.g. due to incorrect storage.

The activation of this 2 component adhesive system can be effected simply by bringing the hardener function film and the binder function film together. Alternatively or additionally, the activation can also take place via a pressure element and/or by means of an energy input.

Alternatively, it is also possible to configure the hardener and binder as a function film which is divided into at least one hardener region and one binder region. The division can be configured using a strip-like pattern or also as any other pattern. In addition, further function films supporting the 2 component adhesive system can be added or integrated into the pattern, such as a filler function film or a filler for example.

In a further preferred embodiment of the synthesis element, the at least one function film comprises ABS, PP, PMMA, PVC, a metal and/or a wood fiber film preferably mixed with a polymer or combinations thereof.

These materials can be used cost-effectively as function films. Furthermore, they can be designed to be activatable by different energy sources. The wood fiber film, for example, can be a paper-like material or also a veneer.

Moreover, the present invention provides an apparatus for bonding a connecting face of an edge material to the connecting face of a workpiece by means of at least one synthesis element.

In this case, the apparatus comprises a synthesis element feed device which is configured to apply a synthesis element onto one of the connecting faces, wherein the synthesis element has at least one adhesive function film as the function film. In addition, the apparatus comprises at least one activation device which is configured to activate the adhesive film or other function films of the synthesis element. A combining device also belonging to the apparatus according to the invention is configured to bring the connecting face which is bonded to the synthesis element together with the other connecting face.

The apparatus according to the invention is characterized above all by the fact that it is possible to create an invisible joint with it, wherein an appropriately optimally selected adhesive function film is fed in by the synthesis element feed device.

In another preferred embodiment of the present invention, the synthesis element feed device is further configured to provide the synthesis element with a further function film.

The apparatus according to the invention is characterized by a high level of vertical integration due to the fact that the apparatus is configured to use a synthesis element composed of function films for bonding an edge material to a workpiece. Thus it is possible with the synthesis element feed device to assemble a synthesis element which meets the particular requirements of the product to be manufactured. Thus, for example, a 2 component adhesive compound can be fed to the joint region via the synthesis element feed device, as a result of which edge material and workpiece can be optimally bonded. In particular, when the workpiece and the edge material are of different materials which, for example, behave differently under environmental conditions, it is possible by selecting an appropriate adhesive system to ensure that such different properties do not result in the edge material delaminating from the workpiece.

In a further preferred embodiment of the present invention, the activation device is configured to activate function films selectively.

Function films which are activatable require no additional adhesive layer. Particularly when a plurality of function films are brought together, it is advantageous to be able to activate them selectively. This can take place, for example, by means of different energy sources which differ due to the height and/or type of the energy inputs. Examples of such energy sources used are lasers, such as diode lasers, solid-state lasers, fiber lasers, CO2 lasers, or other energy sources, particularly hot air sources, thermal radiation sources, such as in particular infra-red sources, ultrasound sources, magnetic field sources, microwave sources, plasma sources and/or gas injection sources. Each of the energy sources mentioned has its specific advantages. Thus, a laser particularly facilitates targeted and speedy working, while infra-red and plasma sources permit wide track operation and a good depth effect. Energy sources using ultrasound, magnetic fields and microwaves work without contact, have a good depth effect and can thus still input energy into the process even while the coating material is being pressed on. An energy source based on gas injection is particularly suitable for actually forming a substance which possesses adhesive properties by acting on and reacting with the coating material. Hot air sources can be used very well and inexpensively for targeted activation over the surface of a function film.

However, there may also be a desire for restricted simultaneous activation of a plurality of function films. This is the case, for example, when partially activated function films can be used, to stick them first to a connecting face so as to integrate them only temporarily at first into the synthesis element. Complete activation, which can lead to fusion of the function films during an appropriate input of energy, only takes place after the at least partial assembly of the synthesis element but before bonding of the edge material and the workpiece. In the same manner, it is possible in this embodiment to carry out the activation only after the edge material, synthesis element and workpiece have been tacked together.

In a further especially preferred embodiment, the synthesis element feed device additionally comprises a film stretching device which is configured to stretch the synthesis film and/or at least one of the function films to adjust its properties.

Using such a device, it is possible, as already described above, to adjust the size or color saturation before bonding to one of the connecting faces during the coating process. Thus, for example, it is possible to increase the width of the generally strip-like edge material by stretching which is applied using the film stretching device in order to adapt it to the connecting face of the workpiece and the edge material. It is possible in the same manner to adjust the thickness of another function film. Moreover, this device can also be used for an optimized production process in that it can be used to adjust the color saturation of a color function film by stretching. In this context, it is even conceivable to use a function film which is subject to a change in color due to stretching such that said function film can be matched to the specified product characteristics.

In this case, adjustment of the film stretching can be carried out by means of rolls. Here, the at least one function film passes, for example, through two rolls spaced apart from each other which act as a roll pair. By adjusting the distance between their roll surfaces, the material is stretched in the longitudinal axis of the rolls when the function film is fed through. In addition, the conveying speed between rolls which are arranged spaced apart in the conveying direction can be varied by the rolls rotating at different speeds, such that this leads to stretching of the function film in the longitudinal direction which can result in a corresponding reduction in the width of the function film as a result of longitudinal expansion. Other options for bringing about stretching or a change in the dimensions of the function film are also conceivable. Thus, for example, the function film can be stretched by applying heat and/or a blower.

In a further especially preferred embodiment of the present invention, the apparatus additionally comprises a coloring device which is configured to provide at least one of the function films with a specified color.

The coloring device means that the adjustment can take place immediately prior to bonding the workpiece to the edge material. In other words, the coloring device is part of the coating apparatus.

In this case, it is possible to use almost any techniques to adjust the color of the at least one function film. Thus, for example, the function film can be color matched by selectively spraying on color which may be distributed by means of a subsequent input of energy in the joint region. Equally, it is possible to manufacture a function film in a desired color by having it extruded, for example, in the appropriate color by the coloring device. Coloring can also be carried out by spraying on a colored adhesive function film.

Regardless of which of these techniques is used to achieve the color matching, with this embodiment it is possible to satisfy even the highest quality requirements for color accuracy of the product.

In another especially preferred embodiment of the apparatus, the coloring device is configured to create a desired color by integrating at least one colored function film into the synthesis element.

Such a colored function film can be provided prefabricated or, as described previously, it can be produced as part of the coating apparatus. In this case, it is possible to adjust the color saturation or even the color shade together with a so-called film stretching device. Another coloring option using this embodiment of the coloring device is to assemble a plurality of differently colored function films, as already described above, so as to create the desired color shade, preferably with the desired saturation.

PREFERRED EMBODIMENTS OF THE PRESENT INVENTION

Figure 1:
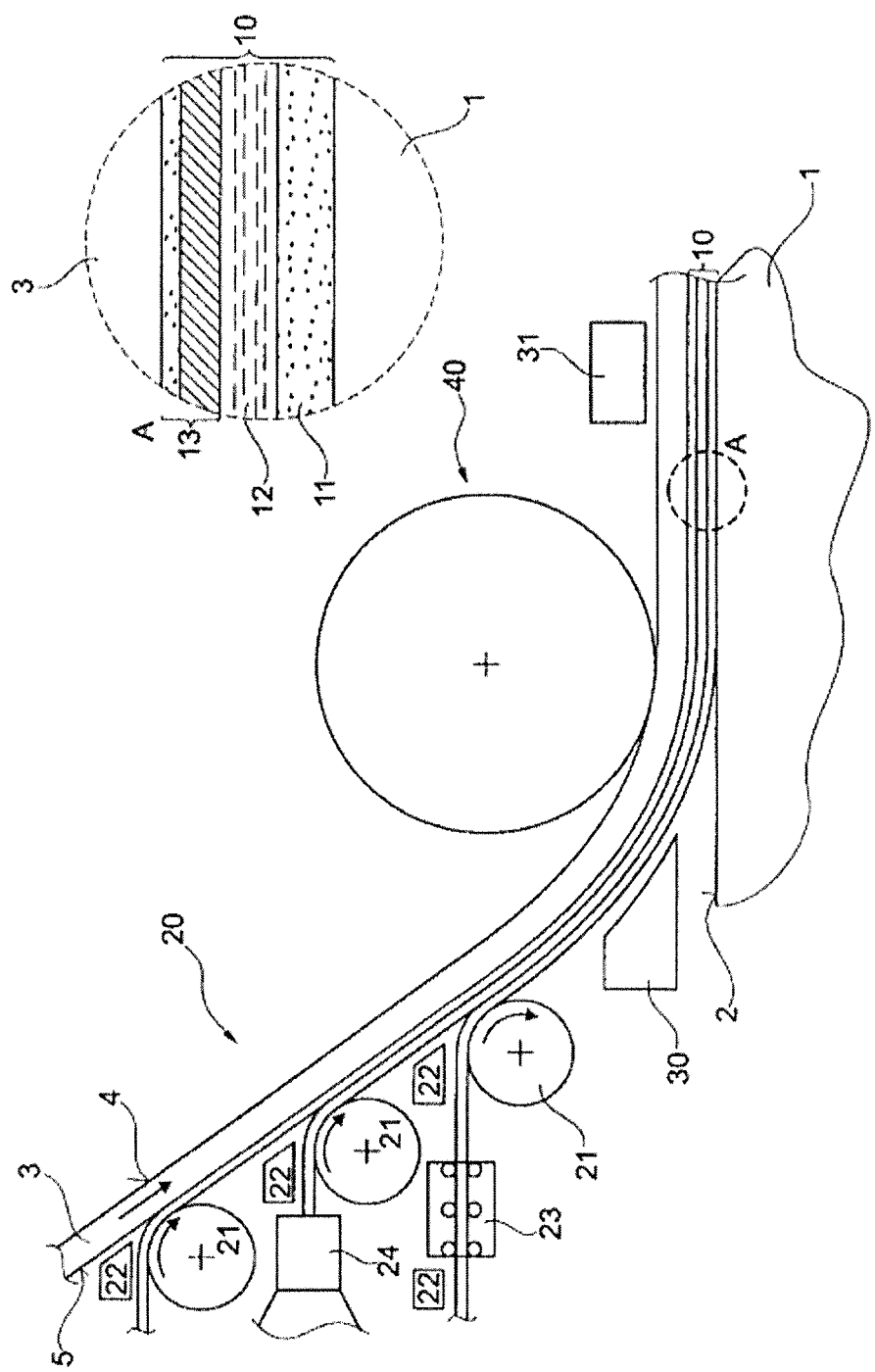
FIG. 1 shows a preferred embodiment of the coating apparatus according to the invention.

FIG. 1 shows an embodiment of the present invention. It should be noted here that for a comprehensive understanding of the present invention the embodiment shown illustrates a plurality of possible features which can be omitted or also otherwise combined according to the previously mentioned general summary and the appended claims.

FIG. 1 shows a workpiece 1 which is bonded to an edge material 3 by way of a synthesis element 10. In the embodiment shown, at least one function film 11, 12, 13 is first bonded to the connecting face 5 of the edge material or edge band 3 in the synthesis element feed device 20. By means of activation devices 22, 30, the synthesis element 10 is activated at least in sections and is then bonded to the connecting face 2 of the workpiece 1. Of course, it is equally possible to first bond the synthesis element to the connecting face 2 of the workpiece 1, followed by bonding the synthesis element 10 to the connecting face 5 of the edge band 3.

Bonding of the individual components of this coating system takes place preferably by means of activation. On the one hand, the workpiece 1 is bonded here to the edge material 3 via the synthesis element 10 by means of activation. On the other hand, with a synthesis element 10 composed of a plurality of function films, the function films are bonded to one another, preferably by activating said function films, in order to produce said synthesis element 10.

Feeding in of the synthesis element 10 and if necessary also assembly of the synthesis element 10 takes place via the synthesis element feed device 20. In this case, the synthesis element 10 composed of at least one function film is applied to one of the connecting faces 2, 5 by way of a pressure means 21. The synthesis element 10 is preferably applied via activation of at least one of the function films 11, 12, 13 contained in the synthesis element 10. If the synthesis element 10 comprises only one function film 11, then it can be activated by the function film activation device 22, the synthesis element activation device 30 and/or the synthesis element activation device 31.

In this case, the function film activation device 22 is arranged next to the pressure element 21 for each function film. If activation is carried out solely by the function film activation device 22, then the activation is designed such that it is sufficient first to bond the function film to the one connecting face 2, 5 via the pressure device 21 and subsequently to apply the opposing side of the function film to the other connecting face 5, 2 by means of the pressure device or the combining device 40.

Moreover, it is possible to perform activation at least partially via the synthesis element activation device 30. The synthesis element activation device is arranged at a point of the coating apparatus at which the synthesis element 10 is composed completely of the function films 11, 12, 13. Sole activation by the synthesis element activation device 30 is also possible in that the pressure elements 21 of the synthesis element feed device 20 merely assemble the function films which, however, are only activated at the synthesis element activation device 30. Additionally or alternatively, it is possible to carry out activation downstream of the combining device 40.

The synthesis element activation devices activate the assembled synthesis element. If the synthesis element 10 is composed of a plurality of function films, selective activation of one or more of the function films can be achieved by means of the measures already described above and explained again below.

In the enlarged section A, FIG. 1 shows a synthesis element 10 which is composed of the function films 11, 12 and 13. Of course, it can comprise, for example, only the adhesive function film 11. The synthesis element 10 shown in Detail A has an adhesive function film 11 bonded to the connecting face 2 of the workpiece 1. This adhesive function film 11 is in turn bonded to a further function film 12. The function film 12 may, for example, be a carrier function film onto which the adhesive function film has been applied by way of the synthesis element feed device. However, the function film 12 can equally be an absorbent, reflective or insulating function film.

The function of function films 12 designed in such a way can most easily be explained with the help of Detail A of the Figure together with the function films 11 and 13. The function film 13 is a partially activatable function film which is preferably fed to the synthesis element feed device 20 as prefabricated function film 13. The activatable portion of the function film 13 is bonded in the present example to the connecting face 5 of the edge material 3. With regard to the embodiment of the coating apparatus shown in FIG. 1, the function film 13 is applied first to the connecting face 5 of the edge material 3 via a pressure element 21. This takes place preferably under the influence of the function film activation device 22, which activates the activatable portion of the function film 13 in such a way that the function film 13 is bonded firmly to the edge material 3.

This manufactured bond of edge material 3 and function film 13 is guided to the next stage of the synthesis element feed device 20 in which the function film 12 is again fed in via a further pressure element 21. A plurality of function films can also be fed in via the same pressure element 21. Bonding of the function film 12, which as previously described comprises the insulating, reflective or absorbent function film, is preferably activated with the function film activation device 22 so that a bond to the function film 10, which is already located on the edge material 3 on the opposing side, is facilitated by way of the pressure element 21.

The bond now created from function films 12 and 13 and also from the edge material 3 will then be fed to a further station of the synthesis element feed device 20 to complete the synthesis element 10 in the present embodiment.

In this station of the synthesis element feed device 20, the adhesive function film 11 is applied to the previously described function film 12. Here also, this preferably takes place by means of activation via the function film activation device 22.

Once the adhesive function film 11 has also been fed to the synthesis element 10 via a pressure element 21, a further or renewed or even exclusive activation can be carried out by means of the synthesis element activation device 30. Here, the function film 12 can support the selective activation of the adhesive function film 11 by supporting the input of energy due to absorbent, reflective or insulating properties.

In this context, a reflective property of the function film 12 would cause energy emitted by the synthesis element activation device 30 to penetrate into the adhesive function film 11. The portion of the energy input which penetrates the adhesive function film 11 is reflected back on striking the function film 12 into the adhesive function film 11 where it contributes to activation of said adhesive function film 11. Consequently, the function film 12 with reflective property is not only advantageous for selective activation of a provided function film but also ensures that its activation takes place with low energy losses.

If the function film is a function film with absorbent properties, then the incoming energy input would be absorbed by the function film 12 and, as was previously the case for a function film 12 with reflective properties, would likewise not be passed on to the activatable portion of the function film 13.

To prevent a renewed activation of the function film 12 during activation of the adhesive function film 11, this preferably takes place differently for the adhesive function film 11 than for the function film 12, that is preferably using one of the techniques already described above.

The synthesis element 10 treated in one of the specified ways is then brought together with the second connecting face in the combining device 40, in the present case with the connecting face 2 of the workpiece 1.

After this combining process, it may be provided that the ultimate strength of the bond between the function film 13 and the edge material 3 is to be achieved by means of a reactivation. Such an activation is illustrated schematically in FIG. 1 by the synthesis element activation device 31. At this point, a function film 12 configured as described previously would again ensure that only selective activation of the activatable portion is executed by the function film 13 so as to prevent an energy input into the adhesive function film 11, which is bonded to the other connecting face, and thus to prevent delamination.

Every function film can be pretreated by a film stretching device 23 before combining with the synthesis element 10 in order to influence its dimensions and/or color characteristics as described previously. In the film stretching device 23 shown in FIG. 1, a reduction in the thickness of the function film 11, 12, 13 takes place first of all by means of at least one roll pair. In this case, there is a widening of the function film in its transverse direction, i.e. perpendicular to its running direction. This effect can be utilized to achieve an adaptation of the width of a synthesis element or of a function film to the width of the edge material 3 or the thickness of the workpiece 1.

If this effect, such as during adjustment of the color saturation of a function film 11, 12, 13, is not desired, then it is still possible via the film stretching device 23 according to the invention to increase the feed speed after reducing the film thickness such that the function film is stretched in its longitudinal direction. This procedure for deforming a function film can be supported by activation or partial activation of the function film before or during its deformation by a function film activation device 22.

Furthermore, it is possible to integrate a coloring device 24 into the apparatus shown in FIG. 1. Coloring for the synthesis element 10 takes place by means of one of the methods already described above. The coloring device can be connected in series with a film stretching device 23 to extend the adjustment options.

The function films can be provided prefabricated to the synthesis element feed device 20. However, it is also possible, as indicated in the case of the coloring device 24, to produce the function films as part of the synthesis element feed device by means of extrusion or application to a carrier function film. In this case, the application is carried out not by a pressure element 21 but by spraying or pouring. Such production of a function film can take place as part of the color matching already described.

It is also possible to effect the color matching by means of additive color function films. More precisely, a specified color is produced by combining at least two color function films. Such additive production of a color can take place, for example, based on known color models, such as RGB or CMYK. Adjusting the color of the joint region is preferably supported in that on activating the color function films, which are combined with each other, they fuse together and thus form a uniform color.

It is also possible to create a color match by spraying a desired color onto a function film 11, 12, 13. In this case, the function film is preferably designed such that it absorbs the color, i.e. the color is distributed evenly over the thickness of the function film. An activation device 22, 30, 31 can also support even distribution in the function film or in the synthesis element as a whole.

Other coloring techniques for color matching the joint region are also conceivable, that is preferably those in which color matching takes place by means of an input of energy such that the chemical and/or physical properties of a function film are varied according to the color desired.

For example, a metal layer can be used as the reflective function film. It is possible, for example, to use an absorbent layer of wood fibers as the function film for coloring.

It can be a further task of the function films 11, 12, 13 to match the bond between an edge material 3 and the workpiece 1 to the properties thereof. Thus, for example, the edge materials are mostly low-absorbency materials while the narrow edge of a workpiece 1 can be composed of a material that has a high absorption capacity, due to its porosity for example. This can lead to difficulties particularly if the joint region is to be executed as an invisible joint. Adhesives with which bonding is possible such that an invisible joint is produced over an especially narrow joint region (approx. 0.2 mm) tend to be low viscosity in the activated state. On the one hand this results in an evenly thin distribution of the adhesive or bonding agent, on the other hand, however, it results in slight penetration of the adhesive into an absorbent material of a connecting partner.

In addition to this, adhesives that are suitable for an adhesive function film with which an invisible joint can be created are usually more expensive. In such a case, the coating apparatus according to the invention has the advantage that it can be used to produce a more cost-efficient adhesive compound which forms the synthesis element 10 or is integrated therein.

Moreover, a 2 component adhesive system can be used for bonding which, as already described above, is composed of at least one function film 11, 12, 13. In this case, even absorbent materials can be reliably bonded to the edge material 3, in particular by the provision of fillers.

Thus, in this context it is possible, for example, to apply the adhesive function film 11 intended for the invisible joint to a carrier function film 12 which, on bringing the edge material 3 together with the workpiece 1, bonds them. In the process, the adhesive function film 11 is directed towards the connecting face or bonds to the face which has the lower absorbency. By comparison, the carrier function film 12 is directed towards the connecting face which has the higher absorbency. On activating the activatable carrier function film 12, for example, it fills the pores of the absorbent workpiece 1 such that the result is lower adhesive losses in the adhesive function film 11. Consequently, the bond between edge material 3 and workpiece 1 is improved while simultaneously saving on the more expensive adhesive used for the adhesive function film 11.

The coating apparatus is designed with the devices described above depending on the level of vertical integration required of it. In any case, the joint region between the edge material 3 and the workpiece 1 is matched visually and structurally to the quality requirements of the product to be manufactured. The result is less waste, a greater range of producible variations and a better aesthetic result.

Figure 2:
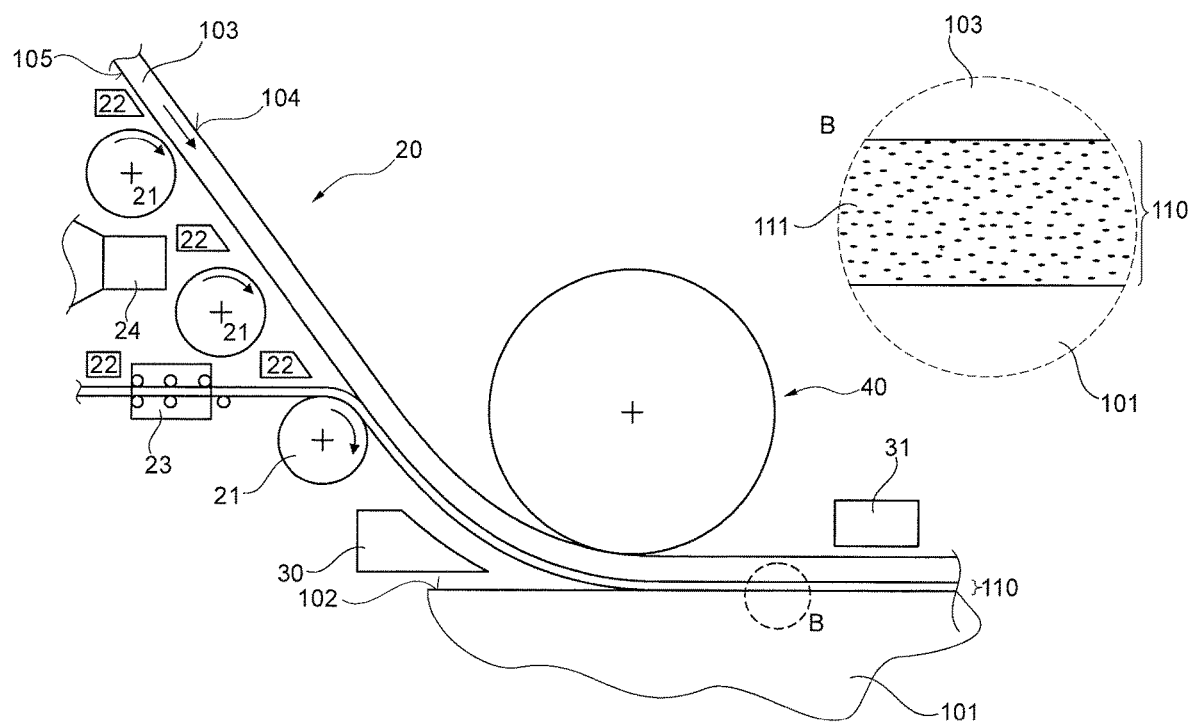
FIG. 2 shows an alternative preferred embodiment of the coating apparatus according to the invention.

FIG. 2 shows an alternative embodiment of the present invention. Is should be noted here that, for a comprehensive understanding of the present invention, the embodiment shown illustrates a plurality of possible features which can be omitted or also otherwise combined according to the previously mentioned general summary.

FIG. 2 shows a workpiece 101 which is bonded to an edge material 103 by way of a synthesis element 110. In the embodiment shown, a single function film 111 is bonded to the connecting face 105 of the edge material or edge band 103. By means of the activation devices 22, 30, the synthesis element 110 is activated and is then bonded to the connecting face 102 of the workpiece 101. Of course, it is equally possible to first bond the synthesis element to the connecting face 102 of the workpiece 101, followed by bonding the synthesis element 110 to the connecting face 105 of the edge bond 103.

Pursuant to the alternative preferred embodiment shown in FIG. 2, the sole function film 110 is an adhesive function film which, upon activation, secures the workpiece 101 to the edge material 103. See Detail B of FIG. 2. In this embodiment the function film is composed solely of an adhesive. In other words, according to the invention, the adhesive function film itself takes over the function of a carrier material and is self-supporting. A visually very high quality and visible joint is produced due to the fact that additional layers of material are omitted. Consequently, the method according to the invention shown in FIG. 2 is particularly suitable for the connecting faces of workpieces and edge materials in which any additional material in the joint region would result in a thicker joint. Further details concerning the activation of this adhesive material in the joining of the workpiece with the edge material are discussed in more detail with regard to the disclosures of FIG. 1 and are incorporated herewith.

LIST OF REFERENCE NUMBERS

1 Workpiece
2 Connecting face of the workpiece
3 Edge material
4 Visible surface of the edge material
5 Connecting face of the edge material
10 Synthesis element
11 Adhesive function film
12 Activatable function film (e.g. carrier function film)
13 Partially activatable function film
20 Synthesis element feed device
21 Pressure element
22 Function film activation device
23 Film stretching device
24 Coloring device
30 Synthesis element activation device
31 Synthesis element activation device
40 Combining device
101 Workpiece
102 Connecting face of the workpiece
103 Edge material
104 Visible surface of the edge material
105 Connecting face of the edge material
110 Synthesis element
111 Adhesive function film

The invention claimed is:

1. A method for bonding a connecting face of an edge material to a connecting face of a workpiece by a synthesis element, wherein the method comprises the steps:
   providing the workpiece,
   feeding in the synthesis element, which comprises one or more function films, wherein at least one of the one or more function films forming the synthesis element consists of an adhesive to form an adhesive function film, wherein the adhesive function film is self-supporting before forming the synthesis element and before being applied to any connecting face,
   activating the adhesive function film,
   applying the synthesis element onto one of the connecting faces,
   bonding the synthesis element to the other one of the connecting faces such that the workpiece and the edge material are bonded together by the synthesis element located between them.

2. The method according to claim 1, in which the synthesis element further comprises a carrier function film.

3. The method according to claim 2, in which the carrier function film is activatable in a different way from the adhesive function film.

4. The method according to claim 1 further comprising integrating at least one further function film into the synthesis element, wherein the further function film is provided on one side with an adhesive function film.

5. The method according to claim 4, in which the further function film supports activation of at least one other function film or prevents activation.

6. The method according to claim 4, in which at least one portion of a joint region is color matched to at least one of the one or more function films to form one or more colored function films.

7. The method according to claim 6, in which saturation of the one or more colored function films is adjusted on applying by stretching.

8. The method according to claim 6, in which color matching takes place with a plurality of differently colored function films.

9. The method according to claim 1, in which the dimensions of the synthesis element or of at least one of the one or more function films are adapted to the connecting face thereof by stretching.

10. A synthesis element for bonding a workpiece to an edge material having one or more function films, wherein at least one function film consists of an adhesive to form an adhesive function film and wherein the adhesive function film is self-supporting before forming the synthesis element and before the synthesis element is applied to a connecting face of the edge material on the workpiece.

11. The synthesis element according to claim 10, having at least one further function film, which is selected from the group consisting of a carrier function film, an information function film, an insulation function film, an absorption function film, a reflection function film and a color function film.

12. The synthesis element according to claim 10, in which the adhesive function film is selected from the group consisting of polyurethane, polyvinyl acetate, ethylene-vinyl acetate, polyolefin and amorphous poly-alpha-olefins.

13. The synthesis element according to claim 10, in which the adhesive is formed from a 2 component adhesive system which comprises one hardener function film and one binder function film.

14. The synthesis element according to claim 10, in which the at least one function film is selected from the group consisting of acrylonitrile butadiene styrene, polypropylene, polymethyl methacrylate, polyvinyl chloride, a metal and a wood fiber film mixed with a polymer or combinations thereof.

15. An apparatus for bonding a connecting face of an edge material to the connecting face of a workpiece via a synthesis element, wherein the apparatus comprises:
a synthesis element feed device which is configured to apply a synthesis element onto connecting faces, wherein the synthesis element comprises one or more function films, wherein the synthesis element has at least one adhesive function film consisting of an adhesive as the one or more of the function films,
an activation device which is configured to activate the adhesive function film, and
a combining device which is configured to combine the connecting face bonded to the synthesis element to the other connecting face, and
wherein the adhesive function film is self-supporting before forming the synthesis element and before the synthesis element is applied to any connecting face.

16. The apparatus according to claim 15, in which the synthesis element feed device is further configured to provide the synthesis element with a further function film.

17. The apparatus according to claim 15, in which the activation device is additionally configured to selectively activate function films.

18. The apparatus according to claim 15, in which the synthesis element feed device further comprises a film stretching device which is configured to stretch the synthesis film and/or at least one of the function films to adjust at least one of its properties.

19. The apparatus according to claim 15, which further comprises a coloring device which is configured to provide at least one of the function films with a specified color.

20. The apparatus according to claim 15, which further comprises a coloring device which is configured to produce a desired color by integrating at least one of the colored function films into the synthesis element.

* * * * *